United States Patent [19]

Kaufman, III et al.

[11] Patent Number: 4,514,677

[45] Date of Patent: Apr. 30, 1985

[54] TWO STAGE ELECTRICAL BRAKING FOR A VARIABLE SPEED AC INDUCTION MOTOR

[75] Inventors: George A. Kaufman, III; Mark J. Kocher, both of Charlottesville, Va.

[73] Assignee: General Electric Company, Charlottesville, Va.

[21] Appl. No.: 504,486

[22] Filed: Jun. 15, 1983

[51] Int. Cl.³ .............................................. H02P 3/24
[52] U.S. Cl. .................................... 318/759; 318/760
[58] Field of Search ............... 318/758, 759, 760, 763, 318/764, 744

[56] References Cited

U.S. PATENT DOCUMENTS 2,477,155  8/1949  Fuge ..................................... 318/763
3,153,182  10/1964 Choudhury ........................... 318/759
3,581,168  5/1971  Kirkby ................................. 318/759
4,305,030  12/1981 Lorenz ................................. 318/759

Primary Examiner—David Smith, Jr.
Attorney, Agent, or Firm—Ormand R. Austin

[57] ABSTRACT

A two-stage electrical braking system for a variable speed alternating current induction motor powered from a variable frequency, variable voltage power source utilizes capacitance connected across a primary winding of the motor in a first stage of braking and short-circuits the primary winding in a second braking stage. The system is arranged such that the control of the two braking stages is independent of the motor terminal voltage and braking can be initiated by either a braking command or automatically upon interruption of power to the system. The control system uses a fixed time delay to initiate the second stage of braking a predetermined time interval after the first stage is initiated.

2 Claims, 1 Drawing Figure

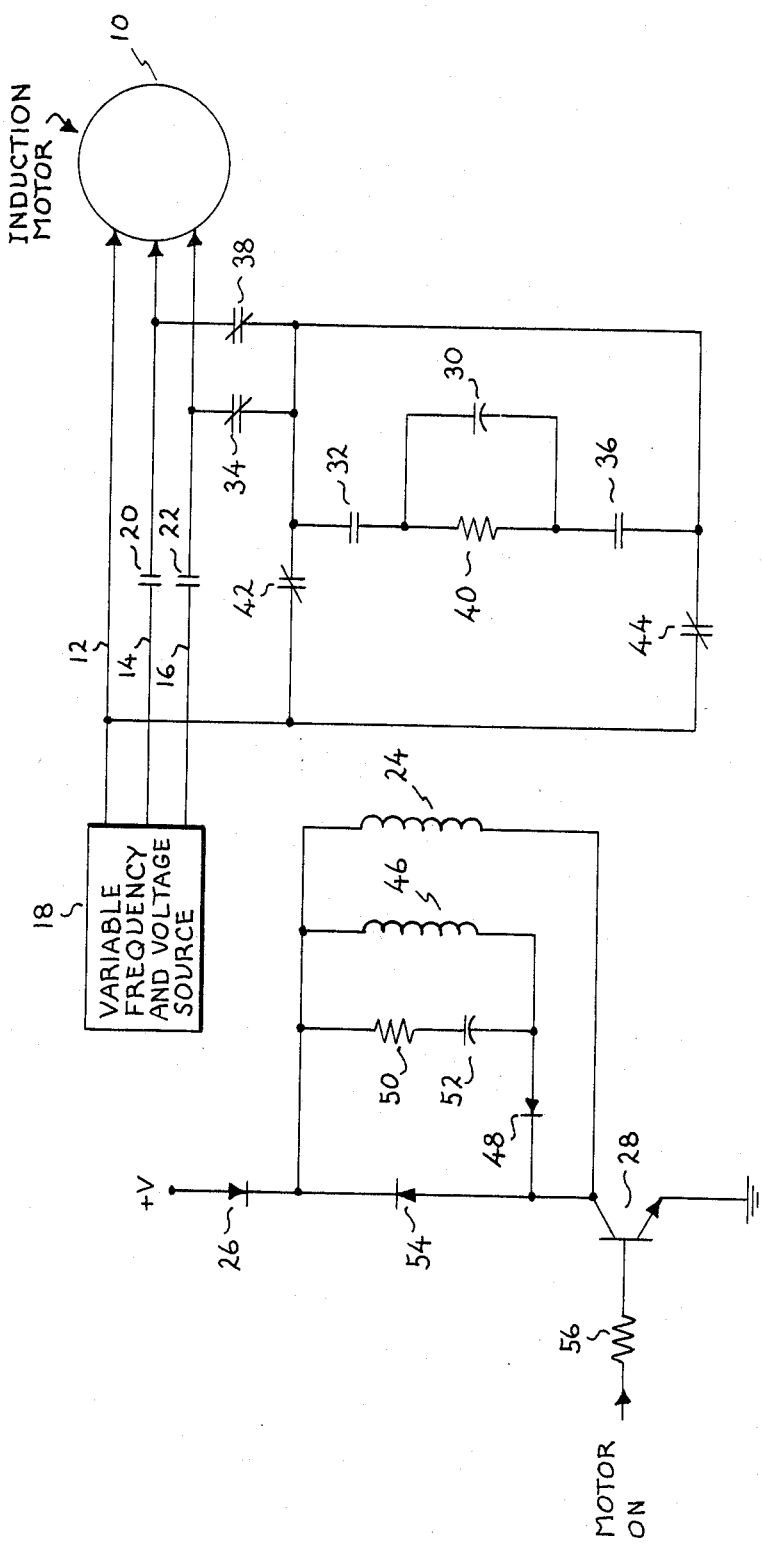

TWO STAGE ELECTRICAL BRAKING FOR A VARIABLE SPEED AC INDUCTION MOTOR

BACKGROUND OF THE INVENTION

The present invention relates to dynamic braking of polyphase alternating current induction motors.

In many applications of alternating current (A.C.) induction motors, e.g., machine tool feed drives for milling, drilling and turning machines, it is desirable to rapidly stop motion of the motor when power to the motor is interrupted either intentionally or due to any designated fault. Various types of braking of A.C. induction motors are well known including mechanical friction braking, electrical braking using direct current injection into a stator winding of the motor, capacitive self-excitation and magnetic braking by short-circuiting the motor stator winding. Because mechanical apparatus to enable friction braking can become a significant portion of the cost of a motor, most braking of motors in the power range of from one to ten horsepower have utilized one or more forms of dynamic electrical braking. U.S. Pat. No. 3,153,182, for example, describes a braking arrangement for a polyphase A.C. induction motor which connects capacitors across each phase of the motor after the power source has been disconnected therefrom and, after the voltage generated by the self-excited motor falls to a predetermined level, connects braking resistors across the phases of the motor. U.S. Pat. No. 3,581,168 also describes an arrangement for connecting capacitors across each phase of an A.C. induction motor to initiate braking followed by short-circuiting of the phases after the voltage generated by the self-excited motor falls to a predetermined level. U.S. Pat. No. 4,311,948 describes an arrangement for connecting a capacitor across one phase of a polyphase A.C. induction motor and subsequently, after the self-excitation voltage has fallen to a predetermined level, short-circuiting one or more of the motor phases utilizing A.C. waveform phase control so that the short-circuiting only occurs during a portion of each A.C. cycle.

As exemplified by the above mentioned patents, the prior art has generally taught two-stage dynamic braking in which the second stage is initiated upon detection that the self-excitation voltage of the motor has fallen to a predetermined level. Accordingly, such systems have required some form of power supply coupled to the self-excited motor for producing electrical energy to maintain operation of a braking system while the motor is braked, an arrangement which cannot be used in a variable speed system since braking might be engaged when the motor is operated at low speeds and consequently at low voltage. In addition, the prior art systems have generally taught that the short-circuiting stage of braking be initiated such that the capacitors used in the first stage are short-circuited giving rise to potential welding of the short-circuiting contactors due to capacitor discharge currents.

SUMMARY OF THE INVENTION

It is an object of the present invention to provide a two-stage electrical braking system for an A.C. induction motor which does not require external power during electrical braking.

It is a further object of the invention to provide a two-stage electrical braking system for an A.C. induction motor which does not require monitoring of self-excitation voltage for the second stage of braking.

It is a still further object of the invention to provide a two-stage electrical braking system for an A.C. induction motor which avoids short-circuiting of the braking capacitors upon initiating a second braking stage.

It is another object of the invention to provide a two-stage electrical braking system for use with a variable speed A.C. induction motor.

In accordance with the present invention there is provided a two-stage electrical braking system for an A.C. induction motor which utilizes capacitance connected across a primary winding of the motor to affect a first stage of braking and subsequently short-circuits the primary winding to affect a second stage of braking. In a preferred arrangement, two contactors, each having one pair of normally open contact sets and one pair of normally closed contact sets, have their actuating coils connected to a power source isolated from the motor. A switch is provided to interconnect the coils and power source when it is desired to energize the motor. Both coils are energized immediately upon closure of the switch while a time-delay circuit consisting of a resistor and capacitor is charged. The time-delay circuit keeps the second stage contactor coil energized for a predetermined time period after initiation of the braking sequence. The first coil controls the contact sets which connect the motor to its A.C. source and also the contact sets which connect the capacitor to the motor for the first braking stage. The second coil controls the contact sets which disconnect the capacitor from the motor and also the contact sets which short-circuit the motor for the second braking stage. The invention thus permits braking to occur only upon removal of power to the contactor coils and automatically sequences the two stages of braking without the necessity of monitoring motor terminal voltage.

BRIEF DESCRIPTION OF THE DRAWING

For a better understanding of the objects, features and advantages of the present invention, reference may be had to the following detailed description taken in conjunction with the single sheet of drawing representative of a preferred embodiment of the invention.

Referring now to the drawing, a three phase A.C. induction motor 10 is connected via power leads 12, 14 and 16 to a variable frequency, variable voltage power source 18. The source 18 may comprise a controllable DC voltage supply and an inverter, both of a type well known in the art. Normally open (N.O.) contact sets 20 and 22 are inserted in the leads 14 and 16, respectively, and serve to isolate the motor 10 from the source 18 when power to the motor 10 is to be interrupted.

The contact sets 20 and 22 are controlled by a contactor coil 24. Preferably the coil 24 is a D.C. coil and consequently has one terminal connected via a diode 26 to a relatively positive terminal of a D.C. voltage source (not shown). A second terminal of coil 24 is connected through a controllable switch, illustrated as an NPN transistor 28, to a relatively negative terminal of the D.C. power source. The transistor 28 can be controlled by a current signal (MOTOR ON) applied to its base terminal. When the MOTOR ON signal is present, the transistor 28 becomes conductive and allows current to flow through coil 24 thereby energizing it and causing contact sets 20 and 22 to close so that power can be applied to motor 10.

A first stage of electrical braking of the motor 10 utilizes a capacitor 30 which can be connected across the motor 10 terminals associated with leads 14 and 16. Capacitor 30 has one terminal connected through a normally open contact set 32 and a normally closed (NC) contact set 34 to the lead 16 at a point intermediate the contact set 22 and motor 10. A second terminal of capacitor 30 is connected through a normally open contact set 36 and a normally closed contact set 38 at the lead 14 at a point intermediate contact set 20 and motor 10. A resistor 40 connected in parallel circuit arrangement with capacitor 30 provides a discharge path for electrical charge accumulated on capacitor 30 after electrical braking and has a value as to not affect brake performance during electrical braking, i.e., it has a relatively large ohmic value.

The normally closed contact sets 34 and 38 are controlled by contactor coil 24. In a preferred embodiment, the contactor comprising the coil 24 and contact sets 20, 22, 34 and 38 is of the type known as a "break before make", i.e., any closed contacts will always open before any open contacts close. Thus, gating transistor 28 into conduction and thereby energizing coil 24 will cause contact sets 34 and 38 to open just prior to closing of contact sets 20 and 22.

The second stage of electrical braking requires two additional NC contact sets 42 and 44. Contact set 42 interconnects power lead 12 and a junction intermediate contact sets 32 and 34. Contact set 44 interconnects power lead 12 and a junction intermediate contact sets 36 and 38. Control of contact sets 32, 36, 42 and 44 is by a contactor coil 46 connected in the same power circuit as coil 24. The coil 46 has one terminal connected to the diode 26 and a second terminal connected via a further isolation diode 48 to a collector terminal of the transistor 28. A resistor 50 and a capacitor 52 are serially connected across the contactor coil 46. Resistor 50 and capacitor 52 form a fixed time delay circuit to maintain energization of coil 46 for a predetermined time period after the MOTOR ON signal is removed from transistor 28. A diode 54 connected in parallel circuit arrangement with coil 24 provides a coil discharge current path when transistor 28 becomes non-conducting.

In operation, before any power is applied, the contact sets 20, 22, 34, 38, 32, 36, 42 and 44 are in the states shown in the drawing. The three power leads 12, 14 and 16 are shorted at the motor 10 and the two phase leads 14 and 16 are open-circuited to the power source 18. When the MOTOR ON signal, typically a 5-volt D.C. signal applied to the base terminal of transistor 28 through a resistor 56, transistor 28 becomes conductive, preferrably saturated, and the coils 24 and 46 become energized. This action closes all the normally open contact sets and opens all the normally closed contact sets. The power source 18 can then be enabled and the motor 10 operated.

Conduction of transistor 28 also permits charging of capacitor 52. The resistor 50 is sized to keep the peak transistor current acceptable and to determine the charge time of capacitor 52.

Braking is initiated by removing the MOTOR ON signal from the base of transistor 28 or by any fault which interrupts power to transistor 28, causing it to become non-conducting. The contactor coil 24 quickly discharges through diode 54 allowing contact sets 20 and 22 to open and contact sets 34 and 38 to close. This disconnects two of the phases from the motor 10 interrupting any stator current and at the same time connects the capacitor 30 across the two interrupted phases. The motor 10 already has a field since the rotor currents continue to exist even through the stator winding is open. Thus, stator currents will rapidly re-establish in the two phases connected to capacitor 30 and braking torque will be produced.

While the self-excitation braking action occurs by virtue of capacitor 30, the contactor coil 46 will be held in its energized state by the charge stored on capacitor 52. The diodes 48 and 26 isolate the capacitor 52 from any discharge path except that through coil 46. After a predetermined time interval, the charge on capacitor 52 will have decayed to a value insufficient to maintain energization of coil 46. At that time, the contact sets 42 and 44 will revert to their normally closed state and the contact sets 32 and 36 will revert to their normally open state. Consequently, the capacitor 30 will be disconnected from the motor 10 and the motor stator leads will all be shorted together. Again, rotor currents exist and force stator currents to re-establish to produce braking torque. It should be noted that the contactor of which contact sets 32 and 36 are a part was selected to be of the type which causes contact sets 32 and 36 to open before contact sets 42 and 44 closed. This latter action avoids discharging the capacitor 30 through any contact sets to avoid potential problems with contact welding.

With coil 46 de-energized, the braking circuit is in the second and final stage and will continue until the motor rotor is substantially at rest. The braking circuit itself is in its ready state and motor operation can be reinitiated at any time by applying power and a MOTOR ON signal to transistor 28.

From the foregoing description, it will be clear that the invention leads itself to numerous variations, modifications, substitutions and equivalents, all of which will now be apparent to those skilled in the art. Accordingly, it is intended that the invention be limited only by the scope of the appended claims.

We claim:

1. A two-stage electrical braking system for a variable speed alternating current induction motor powered from a variable voltage, variable frequency power source, the system comprising:
   a capacitor;
   capacitor connecting means for selectively connecting said capacitor across a primary winding of the motor, said connecting means comprising a first pair of normally closed contact sets and a second pair of normally open contact sets;
   means for connecting one set of said first pair of contact sets in series with one set of said second pair of contact sets between one terminal of said capacitor and a terminal of the motor,
   means for connecting another set of said first pair of contact sets in series with another set of said second contact sets between another terminal of said capacitor and another terminal of the motor;
   control means including a first actuating means for controlling the operation of said first pair of contact sets and a second actuating means for controlling the operation of said second pair of contact sets, said first actuating means being responsive to the interruption of power thereto for causing said first pair of contact sets to revert to their normally closed state whereby said capacitor is connected in parallel with the motor primary winding, and said second actuating means being responsive to the interruption of power thereto for initiating a predetermined time delay period and for causing, at the expiration of said time delay period, operation of said second pair of contact sets whereby said capacitor is disconnected from the motor;

a third pair of normally open contact sets operable by said first actuating means for connecting the motor to the power source when power is applied thereto, said third contact sets being effective to disconnect the motor from the power source when said capacitor is connected to the motor primary winding; and a fourth pair of normally closed contact sets, said fourth pair of contact sets being arranged for normally short circuiting the motor primary winding, said second actuating means permitting said fourth contact sets to revert to their normally closed states when said capacitor is disconnected from the motor at the expiration of said time delay period.

2. The system of claim 1 wherein said control means comprises:

first actuating means comprising an electromagnetic coil having a first terminal connected to one terminal of a power source and a second terminal connected through a controllable switch means to a second terminal of the power source;

second actuating means comprising an electromagnetic coil having a first terminal connected to the one terminal of the power source and a second terminal connected through the controllable switch means to the second terminal of the power source;

a time delay circuit comprising a series combination of a resistor and a capacitor connect in parallel with said second actuating means; and isolating means for electrically isolating said second actuating means and said time delay circuit from said first actuating means.

* * * * *